3,413,344
PENTAHYDROXY HEXANEDIOIC ACIDS
Lawrence A. Quigley, Far Hills, and Henry Zak, Great Notch, N.J., assignors to Industrial Biochemicals, Inc., Edison, N.J., a corporation of New Jersey
No Drawing. Filed Sept. 21, 1965, Ser. No. 489,051
4 Claims. (Cl. 260—535)

ABSTRACT OF THE DISCLOSURE

Novel pentahydroxyhexanedioic acids having the formula $CH_2OH—CROH—CHOH—CHOH—CROH—COOH$ wherein one R is hydrogen and the other R is COOH and salts of such acids, and processes for preparing such acids and salts.

---

This invention relates to dibasic sugar acids and to methods for synthesizing them.

Sugar acids, i.e. pentahydroxyhexanoic acids are known. The current invention, however, describes new sugar acids with unique advantages and uses and a novel method of preparing such sugar acids. More particularly, this invention has to do with pentahydroxyhexanedioic acids, their method of preparation, and various uses of such materials.

The polyhydroxy dicarboxylic acids of the invention have been found particularly useful as sequestering agents, i.e., reacting with cations, particularly metallic ions, to form complexes and thus making such ions unavailable for side reactions or processes. This would allow materials with metallic impurities which might otherwise interfere in a process to be made usable by forming a soluble metal chelate with a selected sugar acid. The compositions of this invention have excellent sequestering ability and are otherwise capable of keeping materials dispersed or suspended in a medium.

Additionally, the compositions of this invention are useful, inter alia, as additives to concrete for reducing the water content of, and retarding the set in, concrete.

More particularly, the products of this invention are the pentahydroxyhexanedioic acids with the following structures and names:

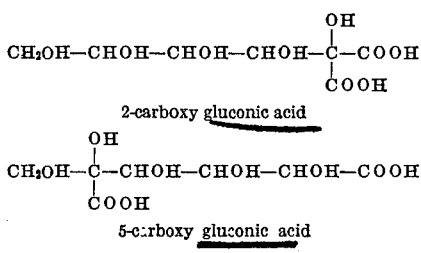

2-carboxy gluconic acid 5-carboxy gluconic acid

As may be readily seen, these compounds are isomers of each other and of other similar compositions such as 2-carboxy gulonic acid, the difference being in the positions of the hydroxyl radicals of the materials relative to each other and the placement of the second carboxylic radical in the molecule, the first one, of course, being characteristically at one end. Although each of these compounds is distinct, with differing properties, it is possible to have small amounts of one or more in the relatively pure matrix, possibly by the establishment of a common enol form.

Thus, d-gluconic acid may be partially converted to d-mannonic acid, another isomeric structure, by heating the former with an organic base. If the starting materials for the compositions of the invention contain "impurities" of this sort, it is to be expected that the final dicarboxy compound will likewise carry the converted isomeric forms.

However, each compound of the invention can be synthesized by the methods described hereinafter in its essentially pure form and thus is capable of individual isolation.

The products of this invention, being carboxylic acids, undergo the usual acid reactions, e.g. amidation, esterification, production of salts, amines and anhydrides, and being hydroxy acids, they also form lactones, i.e. internal esters.

In accordance with this invention, polyhydroxy dicarboxylic acids are prepared by reacting an alkali metal cyanide with a keto gluconic or culonic acid, hydrolyzing the resulting cyanohydrin to a dibasic salt of a dicarboxylic acid and splitting the salt by means of a cation exchange resin to its corresponding free diacid.

The method of manufacturing the products of this invention may be illustrated by the following reaction sequence, showing the synthesis of 2-carboxy gluconic acid:

(1)

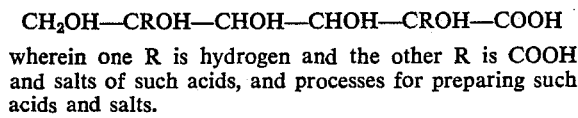

(Product I)

(2) Product I $\xrightarrow[\text{NaOH}]{\text{Hydrolysis}}$ 

(Products)

(3) Product II $\xrightarrow{H^+}$ 

The 2- and 5-keto gluconic acid starting materials for the production of these polyhydroxy dicarboxylic acids are synthesized in turn by the oxidation of glucose in the presence of specific bacterial agents, as described in Industrial and Engineering Chemistry, vol. 32, pp. 1626–1631, (1930). The method of production of the gulonic starting material may be found in the Merck Index, Sixth edition, p. 555 (1952). If a salt of these keto acids is desired as a starting material, the method of Pfeifer et al., Industrial and Engineering Chemistry, vol. 50, pp. 1009–1012 (1958), may be utilized.

In accordance with the process of this invention, a keto acid, prepared as in the manner referred to above, or a salt of the selected acid, such as the calcium, sodium, ammonium, potassium or other salt, is first reacted with sodium, potassium, calcium, ammonium or hydrogen cyanide to obtain the cyanohydrin corresponding to the keto acid. This reaction affects the keto group of the molecule.

This first step takes place in water or a polar oxygenated solvent, including lower alkanols such as methanol and ethanol. The cyanide reagent may be added as a solid or as a water solution; to insure as complete a reaction as possible, up to 10% in excess of the stoichiometric requirement for the cyanide reactant is added, the concentration of the 2-keto acid being preferably 10% to 60% by weight of the solvent. The formation of the cyanohydrin occurs within a period of about one-half to about four hours, preferably at room temperature and atmospheric pressure. The pH of the solution need not be adjusted for the synthesis of the cyanohydrin.

If desired, this product can be isolated at this point, but the preferred method retains the derivative in solution. To obtain the hydrolysis product of the cyanohydrin, sufficient alkali is added to maintain the pH between 8 and 12, and preferably between 9 and 11. If the pH is already within the desired limits, no alkali addition need be made. The most suitable base, when a keto acid salt is the starting product, would have the same cation as that salt, unless a mixed salt of the dicarboxylic acid end-product is desired. Of course, if a keto acid were the starting material, any alkaline substance capable of bringing the pH within the desired limits is suitable. The alkali hydroxides are preferred for this purpose. This hydrolysis reaction is allowed to proceed from about four to about thirty hours, preferably between twelve and eighteen hours, and the temperature may range from about 20° C. to about 100° C., preferably 40° C. to 80° C. The higher temperatures are useful for driving off ammonia, one of the products of the reaction.

The total time-period for the preparation of the dicarboxylic end-product from the keto acid starting material will vary from about four hours to about thirty hours, but usually twelve to eighteen hours is sufficient to solubilize the starting material, treat with cyanide and hydrolyze.

It has been found advantageous in some cases to combine the cyanohydrin and hydrolysis procedures into one step. This is particularly true when the starting material is an alkali metal salt of the keto acid, since the pH of this solution will be basic to start with. The procedure calls for mixing the acid salt, cyanide and alkali together under the pH conditions and temperature restrictions previously mentioned. The total reaction time also remains within the limits given heretofore.

Since calcium salts of acids are usually more insoluble than other alkali metal salts, they are sometimes advantageously treated with sulfuric acid first to form the insoluble calcium sulfate, which is then removed from the reaction vessel. This leaves a solution of the 2-keto acid which then is treated as above. Or this free acid starting material may be first reacted with an alkali and then treated with the cyanide reagent before undergoing hydrolysis.

After hydrolysis is complete, any residual ammonia may be removed by any suitable method such as air or steam sparging. Alternately, this impurity may be removed continuously throughout the reaction by the same technique.

The product at this point is a polyhydroxy dicarboxylic acid salt, in solution, and as such has all the characteristics of a solution of a dicarboxylic sugar acid, allowance being made only for the presence of the cation.

However, it is sometimes desirable to produce the free acid form of this salt. The latter need but be acidified to a pH of about 0.5 to 2.0 to produce the corresponding diacid. This is done most simply by a strong acid such as HCl. The solution is then concentrated, preferably by vacuum evaporation, to a heavy syrup or solid and the latter is extracted with a polar solvent, suitably a lower alkanol such as ethanol to separate the dibasic sugar acid. If the starting salt is calcium, the most suitable acid is sulfuric, since the calcium sulfate which precipitates may be conveniently separated from the diacid by filtration or other convenient method, to yield a relatively pure acid product.

But the preferred method of converting these salts to the corresponding diacids is by contacting the salt solution with a strongly acidic cation exchange resin. Hydrogen ion exchange, using a resin of this type, is most suitable because it minimizes the problems involved in obtaining a relatively pure product.

The resins used for this purpose are composed of particles to which are attached large numbers of ionizible groups. Commercially available forms are based upon the polymerization of the carrier and subsequent treatment with a hydrogen ion source. The conversion of the basic salt to the diacid requires a resin which will exchange the basic cation, sodium, calcium, potassium, etc., in the pH system with readings up to 14, to a range between 0.5 and 2.0.

Any resin which will "split the salt" may be used, but the preferred ones are the strongly acidic resins, suitably the sulfonic type, i.e., where the polymer carrier has been substituted with sulfonic acid groups. As specific examples of suitable resins, there may be mentioned the Amberlite sulfonic type, such as Amberlite IR 120 and 200, available from Rohm and Haas of Philadelphia, Pa., and resins of the Dowex series, such as Dowex 50W, available from Dow Chemical Company, Midland, Mich.

Since the resin is used for its ability to convert the base to the acid form, the throughput (efficiency) is of no primary importance. Thus, the mesh size, which affects the properties of the resin bed, need not be stringently controlled—50 to 400 mesh is a preferable range.

The total capacity of an ion exchange resin is measured by the number of ionic sites per unit weight or volume of resin. The dry weight total capacity is usually expressed in milliequivalents per gram of dried resin. If the performance of the resin is based upon the wet volume total capacity (sites per unit volume of the water-swollen resin), it may be expressed in milliequivalents per milliliter or pounds of ion per cubic foot. The exchange capacity of the sulfonic resins ranges between 1.5 and 2.0 meq./ml. of wet resin but the exchange capacity only affects the efficiency of the process, not the product or process itself.

The exchange may be accomplished by any standard technique, for example, the batch, the fixed bed or the moving bed methods. The fixed bed procedure, where the resin is contained in a column, is currently the most convenient technique for the reaction. Through a vertical, cylindrical tank, approximately half filled with ion exchange resin, and supported on a bed of graded gravel or other filter base, are passed the solutions containing the dibasic salt and the regenerant. The flow may be up or down, but the latter is preferable because of less mechanical problems. Multiple columns may be piped together in a series to give a semi-continuous operation. A further advantage of this columnar resin bed method is that recycling the dibasic salt solution can be easily accomplished, to insure substantially complete conversion to the acid form.

An additional feature of the cation exchange resin for this salt-splitting reaction is the ease of hydrogen ion regeneration when the column is spent (i.e., when its conversion power is exhausted). The latter can be accomplished by treatment with any of the common acid regenerants, such as strong mineral acids, in the manner well known in the art.

The pH of the resin used is adjusted to between 0.5 and 2.0 for the exchange; the pH of the acid product should be within the same limits, but preferably within the range of 1.2 and 1.8, for the most complete yet most economical conversion.

As indicated heretofore, the dicarboxylic acid material produced by the procedures described herein undergoes typical acid reactions. Where desired, derivatives of the acid such as esters, amines, amides or lactones can be prepared. Though it is possible to prepare inorganic metal salts from these acids, it is most convenient to produce the salt directly from some suitable starting material as described heretofore, rather than synthesize the acid first and then the salt therefrom. Amine salts, such as alkanolamine salts, can be prepared by reaction of the acid products of the invention with, for example, triethanolamine.

The products of this invention exhibit unusual metal complexing ability in that they will chelate metallic ions over a pH range from acid to neutral to highly alkaline. Compounds usually selected for their metal ion sequestering ability are naturally occurring substances such as citric and gluconic acids and synthetics such as ethylenediamine tetraacetic acid. If a process which is using one of these chelating agents undergoes a pH change, for instance, from acid to alkaline, the selected reagent may lose much of its effectiveness and allow the metal ion to precipitate or otherwise adversely interfere with the reaction.

The products of the invention retain their metal sequestering ability under both acid and basic conditions and thus, of course, would be the chelating agents of choice in a system showing wide pH fluctuation. These dibasic sugar acids are especially effective in the difficult mid-alkaline pH range, 7.0–10.0.

Such a broad, effective pH range enables these sugar acids to be utilized in a wide variety of processes. Electroplating, photography, inhibition of corrosion in water systems, a mordant in dyeing, derusting and paint stripping, engraving, alkaline pickling and the manufacture of synthetic rubber and plastic polymers are some of the uses to which these polyhydroxy dicarboxylic acids are put. And just as salts of the previously mentioned sequestering compounds may be as valuable as the corresponding acids, e.g., tetrasodium ethylenediamine tetraacetate, the salts of these dicarboxy acids are also useful chelating agents.

These acids and their corresponding salts have also proven useful when admixed with concrete. They act as water reducers and concrete set retarders, permitting a decrease in the amount of water required to prepare concrete having a specific consistency. The average decrease in the water requirement is between 5 and 15%. Moreover, it has been found that the set time for concrete containing these compounds has been retarded from 2 hours for untreated concrete, to 8 hours for concrete batches at 80° F. when treated with 2-carboxy gluconic acid. For comparative purposes, concrete treated with gluconic salts will allow a 5–10% water reduction in the batch and retard the setting time of the concrete from two to four hours.

Additionally, the compounds of this invention produce more uniform reducing and retarding results even under extreme variables in the concrete such as temperature, cement specifications, aggregate size and entrained air. And it has been discovered that the compressive strength of the finished product is increased by up to 25% over identical non-retarded material, after a year in place, as long as the original content of entrapped air (i.e., when mixed) is less than 8%.

Both the chelating and concrete uses of the products of the invention are due to the ability of the compounds to keep materials dissolved or dispersed far beyond a mole for mole basis. This ability, synergistic in nature, is a result of a strong but unstable complex forming between the pentahydroxy hexanedioic radical and the ions, molecules or atoms of the material under treatment and the physical nature of the radical which tends to prevent or retard crystallization or precipitation from the system. These two inter-reacting phenomena produce the unexpected and unique results described heretofore.

One additional advantage of the products of this invention is stability in solution. The acids and their lactones do not crystallize out of aqueous solution, even at sub-freezing temperatures. Since these compositions are normally produced and used in solution, storage presents few problems as indoor facilities would not be mandatory. This exceptional solubility and stability in solution is a unique advantage of these compositions.

The following examples are given for purposes of illustration and not by way of limitation. While the examples will describe the presently preferred embodiment, other modifications will readily occur to those skilled in the art.

Example 1

A total of 160 g. of concentrated sulfuric acid is added to a well-agitated dispersion of 639 g. of calcium 2-ketogluconate in 1300 cc. of water, and the mixture is stirred for one hour. The calcium sulfate which precipitates is filtered off and washed with 100 cc. of water, which is added to the filtrate. The latter is neutralized with 217 g. of 50% sodium hydroxide and 147 g. of sodium cyanide flakes are added over a four hour period while the temperature is maintained at 40° C. After all the cyanide is added, the mixture is boiled for six to eight hours to drive off the ammonia formed as a product of the reaction. After cooling to 30° C., the solution is passed through an ion exchange column, containing Amberlite IR–120 in the hydrogen form, until the pH is about 1.5. The product, 2-carboxy gluconic acid, is concentrated by vacuum evaporation to a liquid containing 52% solids and titrating as 55% acid.

Example 2

Comparison of the sequestration ability of 2-carboxy gluconic acid, gluconic acid and citric acid.

By using the experimental methods given below, the following table has been prepared, showing the chelating ability of 2-carboxy gluconic acid under acid and basic conditions, in mg. per g. of sequestrant.

(I) Calcium sequestration:

| | 2-carboxy gluconic acid | Gluconic acid | Citric acid |
|---|---|---|---|
| pH 4.0 | 1 | 1 | 1 |
| pH 7.0 | 1 | 1 | 1 |
| pH 10.0 | 14 | 1 | 7.5 |
| 1% NaOH | 290 | 127 | 108 |
| 5% NaOH | 435 | 484 | 156 |
| 10% NaOH | 530 | 445 | 47 |

(II) Iron sequestration:

| | 2-carboxy gluconic acid | Gluconic acid | Citric acid |
|---|---|---|---|
| pH 4.0 | 750 | 495 | 1,625 |
| pH 7.0 | 1,200 | 690 | 1,250 |
| pH 10.0 | 950 | 625 | 1,060 |
| 1% NaOH | 2,050 | 2,475 | 10 |
| 5% NaOH | 1,650 | 3,460 | 10 |
| 10% NaOH | 1,350 | 2,970 | 30 |

(III) Copper sequestration:

| | 2-carboxy gluconic acid | Gluconic acid | Citric acid |
|---|---|---|---|
| pH 4.0 | 40 | 1 | 25 |
| pH 7.0 | 260 | 12 | 300 |
| pH 10.0 | 1,050 | 935 | 330 |
| 1% NaOH | 1,350 | 1,155 | 250 |
| 5% NaOH | 1,450 | 1,485 | 310 |
| 10% NaOH | 1,950 | 2,150 | 1,060 |

Procedure

Stock solutions of the three acid sequestrants are prepared—2 g./100 cc. of water.

(I) Calcium.—For the acid solution, 10 cc. (0.2 g.) of the sequestrant is diluted to 20 cc. Sodium oxalate (2 cc. of a 2% water solution) is added and the pH of this solution is adjusted to 4 with acetic acid. A standard 1% solution of calcium acetate is added, dropwise, until a permanent turbidity appears. The amount of chelated calcium is then calculated from the volume of calcium acetate added.

For the alkaline solutions, 10 cc. of a sodium hydroxide solution containing twice the concentration of alkali desired is added to 10 cc. of the sequestrant and the 2 cc. of sodium oxalate indicator added as above. The titration with calcium acetate solution is accomplished in the same manner.

(II) Iron.—For the acid solution, 10 cc. of the sequestrant is added to 180 cc. of water containing 5 cc. of a 2% potassium ferrocyanide and the pH is adjusted to 4 with dilute hydrochloric acid. A standard solution of 90.0 g. of ferric sulfate per liter of water is added, dropwise, with a burette, until a permanent precipitate (ferric ferrocyanide) appears. A blank is run and the volume of ferric sulfate used therein subtracted from the final volume added, to determine the amount of iron sequestered.

For the alkaline solutions, the ferrocyanide indicator is not needed since the product, ferric hydroxide, is insoluble. However, since that product precipitates very rapidly and solubilizes very slowly in the presence of the sequestrant, the alkali solution is added to a mixture of the sequestrant solution and an amount of ferric sulfate solution (determined by trial to be slightly below the chelating limit of the sequestering agent used); the ferric hydroxide which forms rapidly solubilizes in this manner and a slight excess of ferric sulfate solution produces a permanent precipitate. The amount of chelated iron is calculated from the volume of sulfate solution added.

(III) Copper.—For the acid and neutral solutions, potassium ferricyanide is the indicator used (10 cc. of a 2% water solution). A mixture of 10 cc. of the sequestrant and 180 ml. is adjusted to the desired pH with dilute hydrochloric acid or sodium hydroxide. The ferricyanide is added and a standard solution of cupric sulfate (67.4 g. of the pentahydrate per liter) added, dropwise, until a slight turbidity (cupric ferricyanide) is evident. The quantity of copper sequestered is calculated from the amount of cupric sulfate added.

For the alkaline solution, the ferricyanide indicator is not needed since cupric hydroxide, which is the insoluble product, will allow determination of the end point. The method used is identical to that given above for the alkaline iron reaction, with the amount of cupric sulfate determined by trial, as there.

Example 3

Sufficient monoethanolamine is added, with stirring, at a temperature of 30° C., to 300 cc. of the concentrated solution of the acid obtained in Example 1, to bring the pH of the solution to 6.5. The resulting solution of the monoethanolamine salt of 2-carboxy gluconic acid is freeze-dried to obtain the salt in solid form.

Example 4

Sodium 2-ketogluconate (531 g.), 126 g. of sodium cyanide and 20 g. of sodium hydroxide are heated to 50° C. and maintained there for 24 hours, with stirring. An air sparger is used to remove the ammonia formed during the reaction. After the reaction is complete, the mixture is concentrated to a solution with a solids content of 49 to 51%. The product is a solution of disodium 2-carboxy gluconate.

Alternatively, the dibasic free acid is produced by the cation exchange procedure delineated in Example 1.

Example 5

A total of 213 g. of calcium 2-ketogluconate, 164 g. of a 30% solution of sodium cyanide and 500 cc. of water are stirred at room temperature. After 20 hours, the reaction is stopped and the mixture concentrated to a solution of a calcium-sodium dibasic salt, with a solids content of about 50%.

If this solution is ion exchanged to a pH of 1.35, the resulting product, 2-carboxy gluconic acid, has a solids content of 34.4% and titers as 36.2% acid.

Example 6

A total of 225 g. of 2-ketogulonic acid in a liter of water, 60 g. of sodium cyanide and 8 g. of sodium hydroxide are stirred together for 24 hours with the temperature maintained at 50° C. The resulting ammonia is removed from the reaction by means of an air sparger. The solution is then passed through a cation exchanger in the manner described in Example 1 to produce a solution of 2-carboxy gulonic acid.

Example 7

Calcium 5-ketogluconate (3195 g.), 600 cc. of water and 800 g. of concentrated sulfuric acid are mixed at room temperature. After 18 hours, the calcium sulfate precipitate is filtered off and washed with 1500 cc. of water. The filtrate and washings are then neutralized with 1210 g. of 50% sodium hydroxide and then, after raising the temperature of the solution to 50° C., 740 g. of flake sodium cyanide are added. This exothermic reaction is allowed to proceed, with stirring, for 14 hours, no further heating being required. After that time has elapsed, the reaction mixture is evaporated in vacuo to a 50% solution of disodium 5-carboxy gluconate.

Example 8

When 1 to 8 ounces of an approximately 30% solution of a pentahydroxy hexanedioic acid or salt of the invention (the specific amount varying with the compound selected and the conditions of use) is added, per bag of cement (94 lbs.) to a concrete batch, the setting time for the material is retarded for from two to eight hours and the water requirement reduced by five to fifteen percent.

We claim:
1. A compound selected from the group consisting of pentahydroxyhexanedioic acids represented by the formula

$CH_2OH-CROH-CHOH-CHOH-CROH-COOH$ wherein one R is H and the other R is COOH, and the alkali-metal, calcium, ammonium, and lower alkanol-substituted ammonium salts thereof.
2. 2-carboxy gluconic acid.
3. 5-carboxy gluconic acid.
4. 2-carboxy gulonic acid.

References Cited

UNITED STATES PATENTS

| | | | |
|---|---|---|---|
| 2,153,311 | 4/1939 | Pasternack et al. | 260—535 |
| 3,033,900 | 5/1962 | Holstein | 260—535 |
| 3,084,188 | 4/1963 | Horn et al. | 260—535 XR |
| 3,217,034 | 11/1965 | Karabinos et al. | 260—535 |

OTHER REFERENCES

Militzer: Chemical Abstracts, vol. 44, p. 1910(g) (1950).

LORRAINE A. WEINBERGER, *Primary Examiner.*

A. P. HALLUIN, *Assistant Examiner.*